US009514167B2

(12) United States Patent
Yakout et al.

(10) Patent No.: US 9,514,167 B2
(45) Date of Patent: Dec. 6, 2016

(54) BEHAVIOR BASED RECORD LINKAGE (75) Inventors: Mohamed Yakout, Doha (QA); Ahmed K. Elmagarmid, Doha (QA); Hazem Elmeleegy, Doha (QA); Mourad Ouzzani, Doha (QA); Yuan Qi, Doha (QA)

(73) Assignee: QATAR FOUNDATION, Doha (QA)

( * ) Notice: Subject to any disclaimer, the term of this patent is extended or adjusted under 35 U.S.C. 154(b) by 538 days.

(21) Appl. No.: 13/195,319

(22) Filed: Aug. 1, 2011

(65) Prior Publication Data
US 2013/0036119 A1 Feb. 7, 2013

(51) Int. Cl.
*G06F 17/30* (2006.01)

(52) U.S. Cl.
CPC ... *G06F 17/30303* (2013.01); *G06F 17/30495* (2013.01)

(58) Field of Classification Search
CPC .................. G06F 17/30303; G06F 17/30495
USPC ......................................................... 707/737
See application file for complete search history.

(56) References Cited

U.S. PATENT DOCUMENTS

| 7,657,540 | B1* | 2/2010 | Bayliss .................. G06Q 10/10 707/609 |
| 7,912,842 | B1* | 3/2011 | Bayliss ............. G06F 17/30303 707/749 |
| 2003/0187759 | A1* | 10/2003 | Arthus et al. ................... 705/30 |
| 2004/0181526 | A1* | 9/2004 | Burdick ............ G06F 17/30598 |
| 2004/0243539 | A1* | 12/2004 | Skurtovich, Jr. ...... G06Q 40/02 |
| 2005/0102328 | A1* | 5/2005 | Ring et al. .................... 707/201 |
| 2007/0067285 | A1* | 3/2007 | Blume et al. ..................... 707/5 |
| 2007/0106582 | A1* | 5/2007 | Baker .................. G06Q 10/067 705/35 |
| 2007/0220043 | A1* | 9/2007 | Oliver et al. ............. 707/103 R |
| 2008/0162554 | A1* | 7/2008 | Martino ............ G06F 17/30702 |
| 2008/0162580 | A1* | 7/2008 | Ben Harush ...... G06F 17/30699 |
| 2008/0288424 | A1* | 11/2008 | Iyengar .................. G06Q 10/00 706/12 |
| 2008/0306944 | A1* | 12/2008 | Aparicio, IV ........ G06K 9/6298 |
| 2009/0265106 | A1* | 10/2009 | Bearman et al. ............. 701/300 |
| 2009/0271343 | A1* | 10/2009 | Vaiciulis .............. G06N 99/005 706/21 |
| 2010/0019957 | A1* | 1/2010 | Feria ........................... 342/25 F |
| 2012/0016633 | A1* | 1/2012 | Wittenstein ........... G06F 21/552 702/180 |
| 2012/0089534 | A1* | 4/2012 | Liebig et al. ................. 705/348 |

OTHER PUBLICATIONS

Oyama, C Manning; Using feature conjunctions across examples for learning pairwise classifiers, 2004, Machine Learning: ECML 2004.*
SR Yerva, Z Miklós, K Aberer; Quality-aware similarity assessment for entity matching in Web data, Sep. 2011, Information Systems.*

* cited by examiner

*Primary Examiner* — Alexey Shmatov
*Assistant Examiner* — Kurt Mueller
(74) *Attorney, Agent, or Firm* — Mossman, Kumar & Tyler PC (57) ABSTRACT

A computer implemented method for matching data records from multiple entities comprising providing respective transaction logs for the entities representing actions performed by or in respect of the entities, determining a matching score using the transaction logs for respective pairs of the entities and for predetermined combinations of merged entities by generating a measure representing a gain in behavior recognition for the entities before and after merging, and using the gain as a matching score.

19 Claims, 9 Drawing Sheets

BEHAVIOR BASED RECORD LINKAGE

BACKGROUND

Record linkage (RL) is the process of identifying records that refer to the same real world entity. Such records can occur over different data sources (e.g., files, websites, databases, etc.), as well as being in different formats across similar sources for example. A record linkage process can be performed to join or link data sets that do not share a common identifier such as a database key or URI for example, and it can be a useful tool when performing data mining tasks, for example. Record linkage analysis based on entity behavior has also many other applications. For example, identifying common customers for stores that are considering a merge; tracking users accessing web sites from different IP addresses; and helping in crime investigations.

A technique which can be used to match data originating from two entities is to measure the similarity between their behaviors. However, typically, a complete knowledge of an entity's behavior is not available to both sources since each source is only aware of the entity's interaction with that same source. A comparison of an entities' behavior will therefore be a comparison of their partial behaviors, which can be misleading and will generally provide less useful information. Moreover, even in the case where both sources have almost complete knowledge about the behavior of a given entity (such as when a customer who did all their grocery shopping at one store for one year and then at another store for another year), a similarity strategy may not help as many entities do have very similar behaviors. Accordingly, measuring the similarity can at best group the entities with similar behavior together but will not typically find their unique matches.

SUMMARY

According to an example, there is provided a computer implemented method for matching data records from multiple entities comprising providing respective transaction logs for the entities representing actions performed by or in respect of the entities, determining a matching score using the transaction logs for respective pairs of the entities and for predetermined combinations of merged entities by generating a measure representing a gain in behavior recognition for the entities before and after merging, and using the gain as a matching score.

According to an example, there is further provided a computer program embedded on a non-transitory tangible computer readable storage medium, the computer program including machine readable instructions that, when executed by a processor, implement a method for matching data records from multiple entities comprising providing respective transaction logs for the entities representing actions performed by or in respect of the entities, determining a matching score using the transaction logs for respective pairs of the entities and for predetermined combinations of merged entities by generating a measure representing a gain in behavior recognition for the entities before and after merging, and using the gain as a matching score.

According to an example, there is further provided a method for matching records from multiple sources, comprising determining a coarse match for records using a value representing a period of occurrence of certain actions for an entity including data from a merged pair of sources, for a match above a predetermined threshold, using a statistical model to determine a final matching score.

According to an example, there is further provided a method for matching records from multiple sources, comprising providing respective transaction logs for entities representing actions performed by or in respect of the entities, transforming the logs into a predetermined format in order to extract behaviour data for the entities, determining a coarse match for transactions in the logs to provide candidate matches for entities across the logs, determining a fine match for transactions in the logs using a statistical generative model over the candidate matches, and determining matching entities using a score associated with the coarse and/or fine matches.

BRIEF DESCRIPTION OF THE DRAWINGS

An embodiment of the invention will now be described, by way of examples only, and with reference to the accompanying drawings, in which.

DETAILED DESCRIPTION

According to an example, there is provided a system and method, which can be computer implemented method, for record linkage or data matching of data records using behavior information stored in transaction log. The method merges behavior information from each of a candidate pair of entities to be matched. If the two behaviors seem to complete one another in the sense that stronger behavioral patterns (such as consistent repeated patterns, for example) become detectable after the merge, then this provides a strong indication that the two entities are, in fact, the same. A merge strategy according to an example can handle the case where distinct entities have similar overall behaviors, especially when such behaviors are split across the two sources with different splitting patterns (such as 20%-80% versus 60%-40%, for example). In this case, two behaviors (from first and second sources, for example) will complete each other if they correspond to the same real world entity, and not just two distinct entities that happen to share a similar behavior. A matching strategy according to an example can be referred to as a behavior merge strategy, since entities' behaviors are merged and a realized gain is then measured. In an alternative strategy, referred to as a behavior similarity strategy, matching scores can be a measure of the similarity between the two behaviors.

Figure 1:
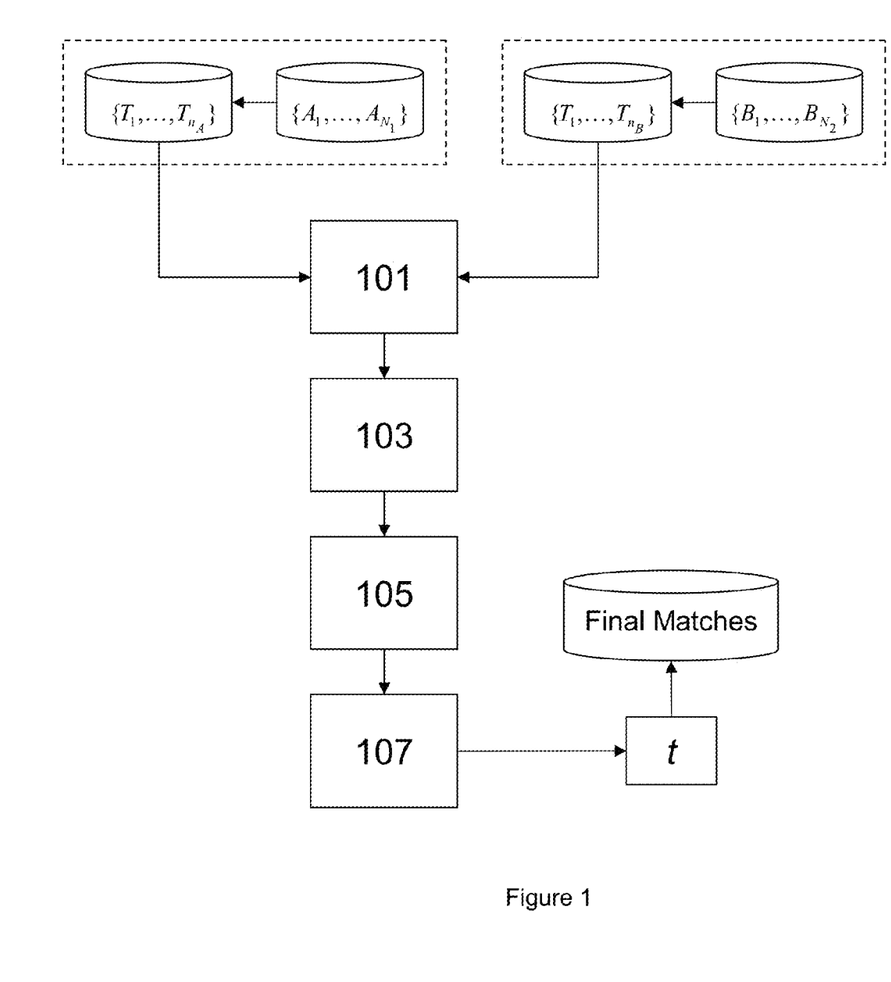
FIG. 1 is a schematic block diagram of a process for determining data matches between two sets of entities according to an example.

FIG. 1 is a schematic block diagram of a process for determining data matches between two sets of entities according to an example. Given two sets of entities $\{A_1, \ldots, A_{N_1}\}$ and $\{B_1, \ldots, B_{N_2}\}$, where for each entity A (and similarly for B) there exists a transaction log $\{T_1, \ldots, T_{n_A}\}$, a method according to an example returns the most likely matches between entities from the two sets in the form of $\langle A_i, B_j, S_m(A_i, B_j) \rangle$, where $S_m(A_i, B_j)$ is a matching function. Given entities A,B (and their transactions), the matching function returns a score reflecting the extent to which the transactions of both A and B correspond to the same entity.

A transaction log, from any domain, will typically keep track of certain types of information for each action an entity performs. According to an example, this can include information such as: (1) the time at which the action occurred, (2) the key object upon which the action was performed and (3) additional information describing the object and how the action was performed (e.g., quantity, payment method, etc). For simplicity, each action will be referred to by its key object herein as will become apparent below.

For a transaction log $\{T_1, \ldots, T_{n_A}\}$, transaction $T_i$ is a tuple in the form of $\langle t_i, a, F\_id \rangle$ in an example, where $t_i$ represents the time of the transaction, a is the action (or event) that took place, and F_id refers to the set of features that describe how action a was performed. There can be similar transaction logs for other entities which include respective sets of tuples in the same form.

In block 101, an initial pre-processing and behavior extraction process is performed. More specifically, raw transaction logs from both sources are transformed into a standard format (described below), and behavior data for each single entity in each log is extracted. Behavior data can be initially represented in a matrix format for example, a "behavior matrix" BM. The standard format provides a processed log which conforms to a predefined format and which can include additional information for an entity and which can generalise some data elements of actions in order to provide a more uniform arrangement for example.

In block 103 a candidate generation phase that uses a coarse matching function is used to generate a first set of candidate matches. When matching a pair of entities, a merge strategy is used as will be described in more detail below. In this phase, each row in a behavior matrix (BM) can be mapped to a 2-dimensional point resulting in a compact representation for the behavior with some acceptable information loss. Such a mapping allows for very fast computations to be performed on the behavior data of both the original and the merged entities. In some examples, and depending on the domain knowledge, other techniques can be applied to further discard candidate matches in this phase as desired. For example, two customers in a shopping scenario may be deemed "un-mergeable" if they happened to shop in two different stores exactly at the same time. In an example, coarse matching can be performed by determining patterns in the behavior of entities, including merged entities, and discarding merged entities which exhibit a matching score below a predetermined threshold. Other alternatives are possible, as will become apparent.

In block 105 entity matching is performed. According to an example, accurate matching of the candidate pair of entities (A; B) is achieved by modelling the behavior of entities A, B, and AB using a statistical generative model, where AB is the entity representing the merge of A and B. The estimated models' parameters can then be used to compute the matching score. In an example, a finite mixture model can be used and expectation maximisation used to fit the mixture model for each specific action of an entity to discover the optimal parameter values which maximize the likelihood function of the observed behavior data.

In addition to the above-mentioned statistical modelling technique, an alternative heuristic technique that is based on information theoretic principles can be used in a matching phase 105. Such an alternative technique can rely on measuring the increase in the level of compressibility as the behavior data of pairs of entities is merged. Such a heuristic technique can be more computationally efficient.

In block 107, final matches are selected by assigning a matching score to each pair of entities and reporting the matches with the highest scores. According to an example, a filtering threshold can be applied to exclude low-scoring matches. To further resolve conflicting matches other techniques such as stable marriage can be used according to an example.

Figure 2:
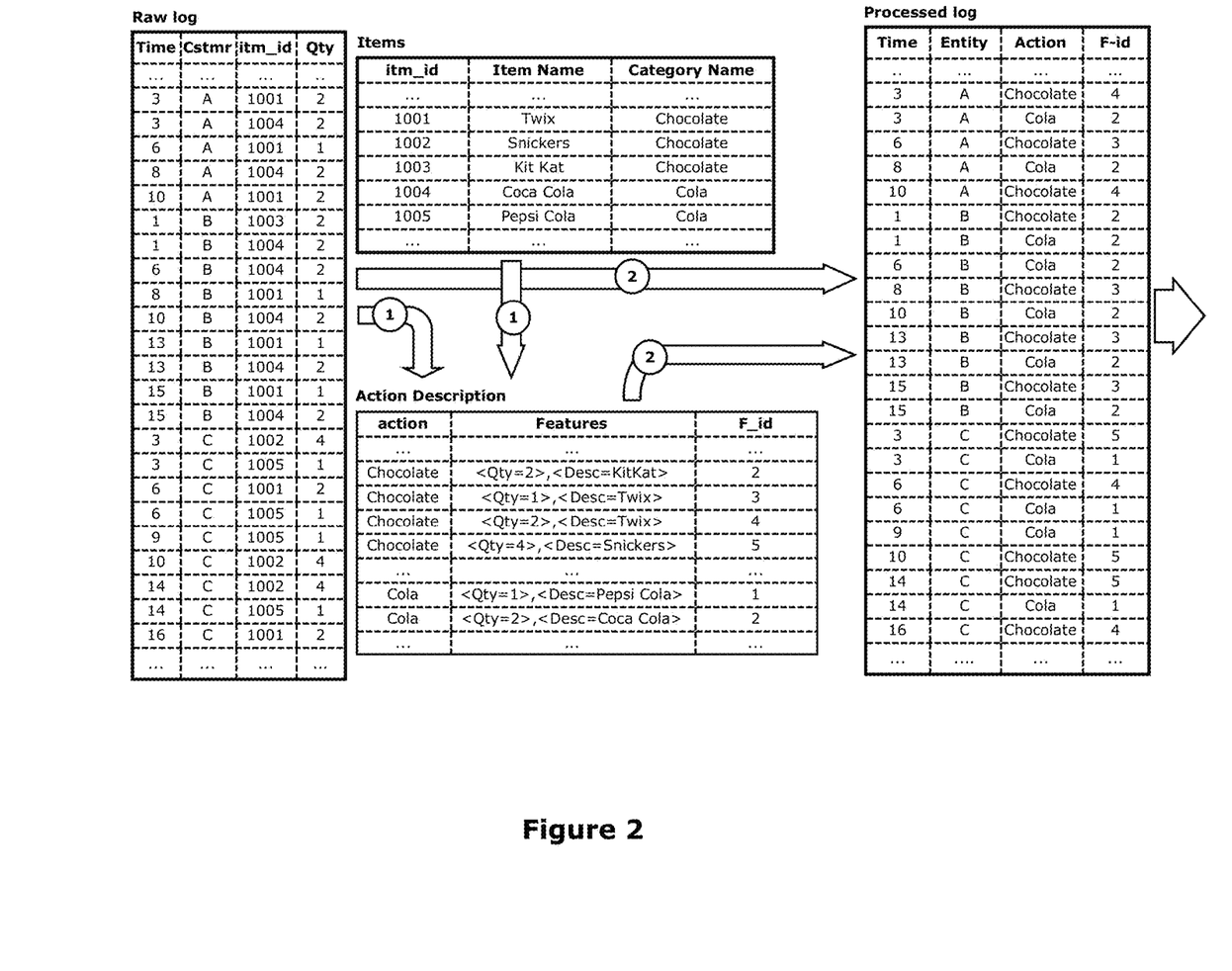
FIG. 2 is a set of tables depicting an example of the pre-processing of raw data.

FIG. 2 is a set of tables depicting an example of the pre-processing of raw data, such as the pre-processing occurring in block 101 of FIG. 1. The "raw log" in FIG. 2 is a table which includes four columns representing the time an item was bought by a customer, the customer (the entity to be matched), an ID of an item bought by the customer, and a quantity. Typically, since the item name may be too specific to be the key identifier for a customer's buying behavior, an alternative according to an example is to use the item category name as the identifier for the different actions. Accordingly, actions in the sense of FIG. 2 can correspond to buying "Chocolate" and "Cola" rather than the specific product for example. The main reason behind this generalization is that, for instance, buying one bar of a particular type of chocolate should not be considered as a completely different action from buying a bar of a different type of chocolate, and so on. Typically, such decisions can be made by a domain expert to avoid over-fitting when modelling behavior. In this case, the specific item name, along with the quantity, will be considered as additional detailed information, which can be referred to as the action features.

The next step is to assign an identification, F_id, for each combination of features occurring with a specific action in the raw log as shown in the "Action Description" table of FIG. 2. This ensures that even if there are multiple features, they can always be reasoned as a single object using a corresponding F_id. Alternatively, if there is only one feature, then it can be used directly with no need for F_id. Finally, the "Processed Log" table of FIG. 2 is generated by scanning/processing the raw log and registering the time, entity, action, and F_id information for each line or entry.

The processed log table of FIG. 2 represents a standardized log for the transactions of the given entities which can be used to determine a BM. That is, the transactions of each entity can be extracted and represented in a matrix of a particular format. Accordingly, given a finite set of n actions performed over m time units by an entity A, the Behavior Matrix ($BM_{i,j}$) of entity A is, according to an example, an n×m matrix, such that:

$$BM_{i,j} = \begin{cases} F_{ij} & \text{if action } a_i \text{ is performed} \\ 0 & \text{otherwise} \end{cases}$$

Where, $F_{i,j} \in F_i$ is the F_id value for the combination of features describing action $a_i$ when performed at time j, and $F_i$ is the domain of all possible F_id values for action $a_i$, i=1, ..., n and j=1, ..., m.

Figure 3:
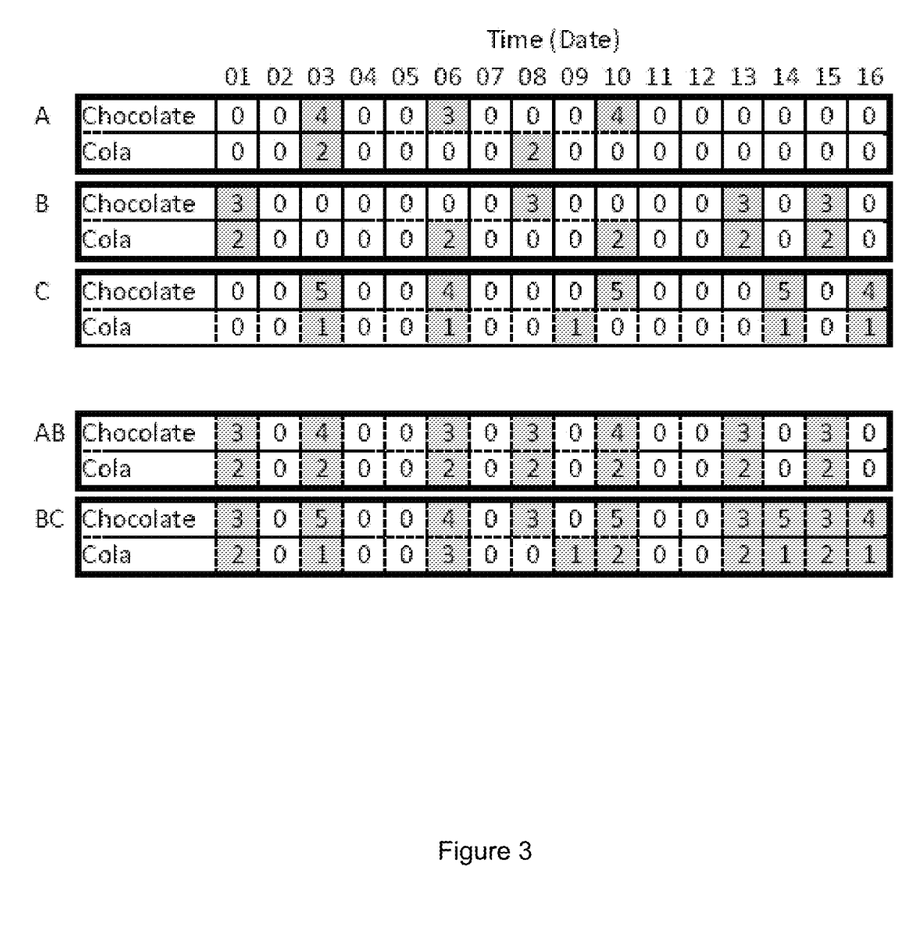
FIG. 3 is a set of tables depicting an example of determined behavior matrices for a set of entities.

FIG. 3 is a set of tables depicting an example of determined behavior matrices for a set of entities. More specifically, BM's for entities (such as customers) A, B and C are shown in FIG. 3. A non-zero value indicates that the action was performed and the value itself is the F_id that links to the description of the action at this time instant. According to an example, a compact representation for the entities' behavior can be derived from the BM representation, and can be constructed and used during an accurate matching phase 105. Such a second compact representation, which is based on the inter-arrival times, considers each row in the BM as a stream or sequence of pairs $\{v_{ij}, F^{(v_{ij})}\}$, where $v_{ij}$ is the inter-arrival time since the last time action $a_i$ occurred, and $F^{(v_{ij})} \in F_i$ is a feature that describes $a_i$ from $L_{a_i}$ possible descriptions, $|F_i|=L_{a_i}$. For example, with reference to FIG. 3, the row corresponding to action $a_i$=chocolate of entity C, $BM_i=\{0,0,5,0,0,4,0,0,0,5,0,0,0,5,0,4\}$, can be represented as $X_i=\{\{3,5\},\{3,4\},\{4,5\},\{4,5\},\{2,4\}\}$.

As described above with reference to FIG. 1, matching entities based on their extracted behavior data is achieved in two consecutive phases according to an example: a candidate generation phase followed by a more accurate matching phase. Ultimately, it is desired to assign a matching score, $S_m$, for each pair of entities (A,B) deemed as a potential match, and then report the matches with the highest scores, such as by reporting the highest scoring matches to a user of a system implementing any of the methods or process described herein.

Figure 4:
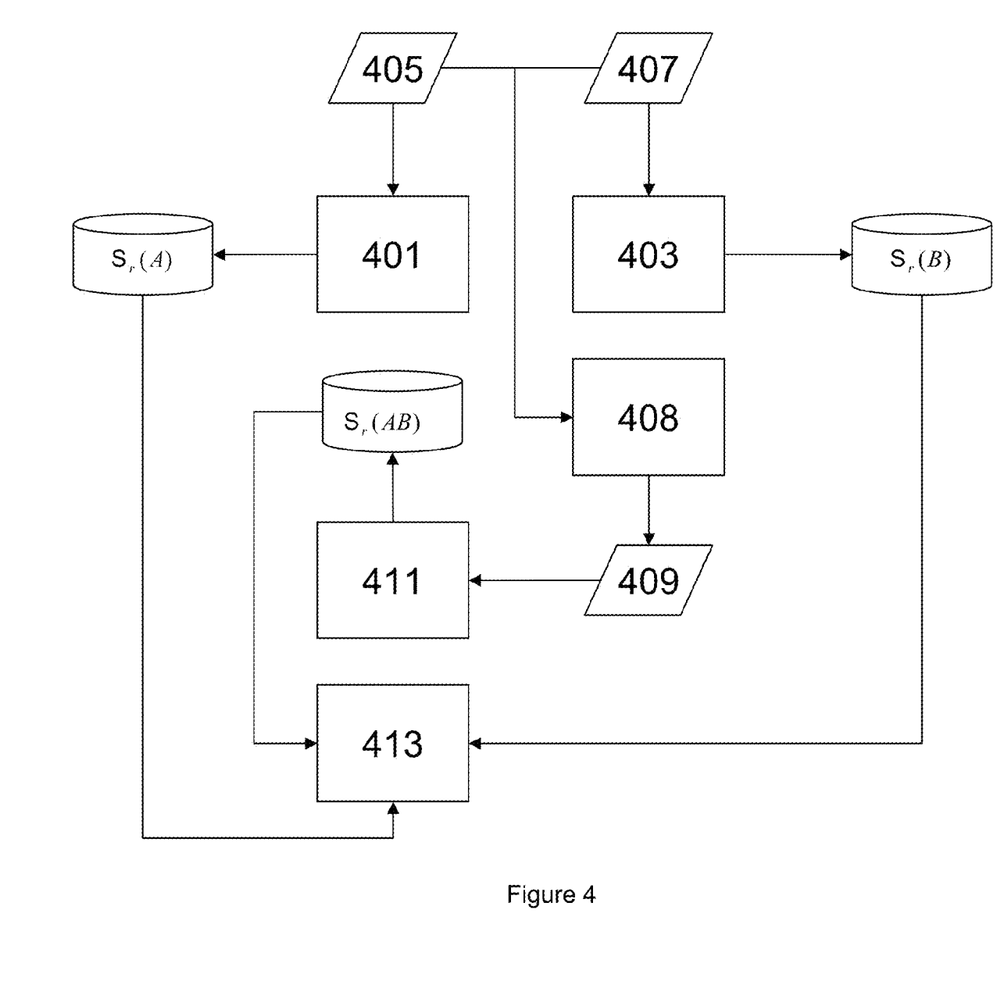
FIG. 4 is a schematic block diagram of a matching method according to an example.

FIG. 4 is a schematic block diagram of a matching method according to an example. To compute $S_m(A,B)$, a behavior recognition score, $S_r$, for each entity (i.e., $S_r(A)$ and $S_r(B)$) is computed in blocks 401, 403. The behavior data of both A (405) and B (407) are then merged in block 408 to construct the behavior of some hypothetical entity AB (409), whose score, $S_r(AB)$, is also computed in block 411. According to an example, the BM of a merged entity includes the sum of the F-ids of the individual entities for each respective time period.

In block 413 a check is performed using the computed behavior recognition scores to see if this merge results in a more recognizable behavior compared to either of the two individual behaviors. Hence, the overall matching score depends on a gain achieved for the recognition scores. More specifically:

$$S_m(A,B) = \frac{n_A[S_r(AB) - S_r(A)] + n_B[S_r(AB) - S_r(B)]}{n_A + n_B} \quad (1)$$

where $n_A$ and $n_B$ are the total number of transactions in the BMs of A and B respectively. Note that the gains corresponding to the two entities are weighted based on the density of their respective BMs.

To better understand the intuition behind the behavior merge strategy, assume that entities A and C are from a source 1 and B is from a source 2 and that their processed log is shown in the "Processed Log" table of FIG. 2. In order to find the best match for entity B, B's behavior is merged with A's behavior—that is the BM for the entities are merged as described above. The same is performed with C, i.e. A's behavior is merged with C's behavior. It is apparent from the resulting merged BM's in FIG. 3 that A is potentially a good match for B; that is, entity AB is likely to be an entity that buys chocolate every 2 or 3 days and prefers to buy 2 liters of cola with either 2 bars chocolate 1 or 4 bars of chocolate 2 for example. However, it is hard to determine a behavior about entity BC. In a real world scenario, more actions than as described above can be dealt with.

According to an example, a recognition score $S_r$, represents the consistency of an entity's behavior along three main components: (1) consistency in repeating actions, (2) stability in the features describing the action and (3) the association between actions. These three components, which will be described more fully below, are represented by three score components for $S_r$: $S_{r1}$, $S_{r2}$, and $S_{r3}$. In an example, $S_r(A)$ is computed from the geometric mean of these three components according to:

$$S_r(A) = \sqrt[3]{S_{r1}(A) \times S_{r2}(A) \times S_{r3}(A)} \quad (2)$$

According to an example, consistency in repeating actions means that entities tend to repeat specific actions on a regular basis following almost consistent inter-arrival times. For example, a user (an entity) of a news web site may be checking the financial news (an action) every morning (a pattern). Stability in the features describing actions means that when an entity performs an action several times, almost the same features are expected to apply each time. For example, when a customer buys chocolate, s/he may mostly buys either 2 types of one chocolate bar or 1 type of another bar, as opposed to buying a different type of chocolate each time and in completely different quantities. The latter case is unlikely to occur in real scenarios. Association between actions means that actions performed by entities are typically associated with each other, and the association patterns can be detected over time. For example, a customer may be used to buying two particular but otherwise unrelated items together every Sunday afternoon, which implies an association between these two actions.

As mentioned above, a candidate generation phase, such as that described with reference to block 103 of FIG. 1 is used according to an example to avoid examining all possible pairs of entities in a computationally expensive phase dedicated to more accurate matching. A candidate generation phase can quickly determine pairs of entities that are likely to be matched. This phase can result in almost no false negatives, at the expense of relatively low precision.

The high efficiency of this candidate generation phase is primarily due to the use of a compact (yet lossy) behavior representation, which allows for fast computations. In addition, only the first behavior component; i.e., consistency in repeating actions, which is captured by $S_{r1}$, is considered in this phase. Note that because the two other components are ignored, binary BMs are used with 1's replacing non-zero values according to an example—that is, a binarised version of a BM is used according to an example.

Each row in the BM, which corresponds to an action, is considered as a binary time sequence. For each such sequence, the first element of its Discrete Fourier Transform (DFT) is computed, which is a 2-dimensional complex number. The complex number $C_A^{(a_i)}$ corresponding to an action $a_i$ in the BM of an entity A is computed according to:

$$C_A^{(a_i)} = \sum_{j=0}^{m-1} BM_{i,j} e^{\frac{2j\pi\sqrt{-1}}{m}} \quad (3)$$

According to an example, it is noted that the lower the magnitude of the complex number, the more consistent and regular the time sequence, and vice versa. If each of the elements in the time series are considered as a vector whose magnitude is either 0 or 1, and their angles are uniformly distributed along the unit circle (i.e., the angle of the $j^{th}$ vector is $$\frac{2j\pi}{m}),$$

then the complex number will be the resultant of all these vectors. If the time series was typically consistent in terms of the inter-arrival times between the non-zero values, then their corresponding vectors would be uniformly distributed along the unit circle, and hence they would cancel each other out. Thus, the resultant's magnitude will be closer to zero for a more uniform distribution representing a more consistent inter-arrival time. Also, note that merging the two rows corresponding to an action a in the BM s of two entities, A, B, is reduced to adding two complex numbers i.e., $C_{AB}{}^{(a)} = C_A{}^{(a)} + C_B{}^{(a)}$.

Figure 5:
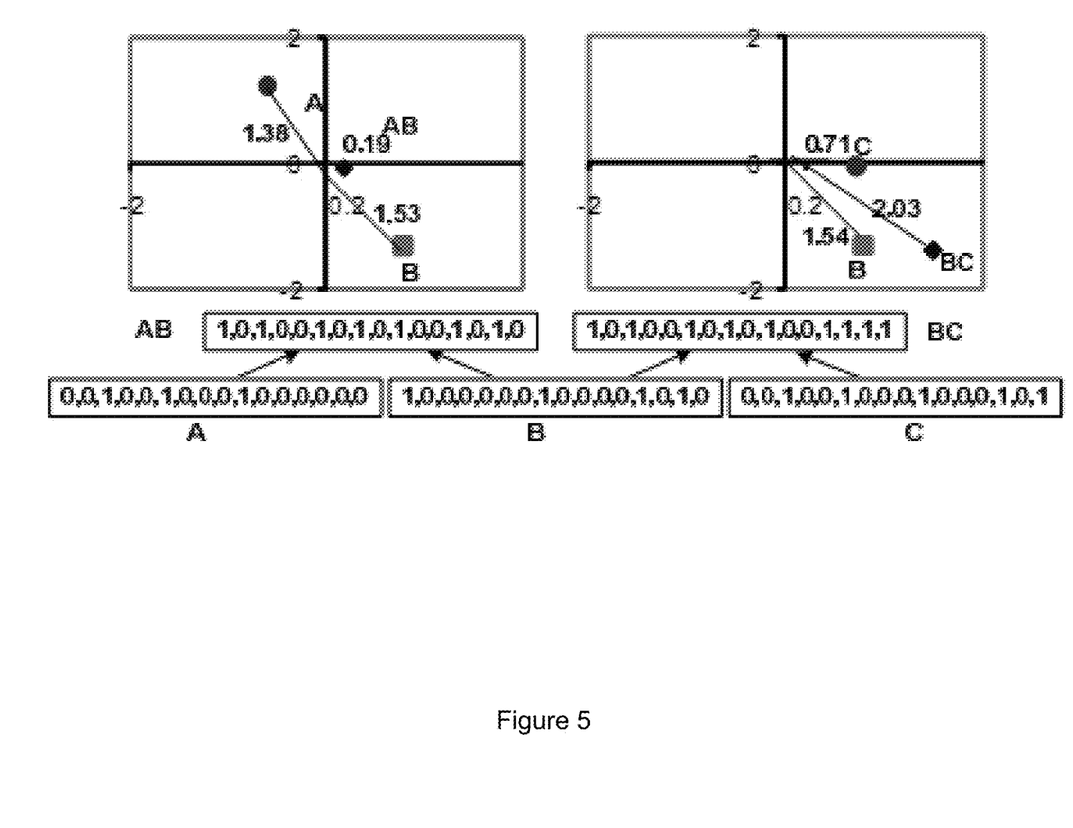
FIG. 5 is a set of charts depicting the action patterns in the complex plane and the effect on the magnitude.

The following example shows how a candidate generation phase can distinguish between "match" and "mismatch" candidates. FIG. 5 is a set of charts depicting the action patterns in the complex plane and the effect on the magnitude. Let $a_A$, $a_B$ and $a_C$ be the rows of action a (chocolate) in the binary BM s of entities A, B and C from FIG. 3. In the chart on the left of FIG. 5, when merging $a_A$ and $a_B$, the magnitude corresponding to the merged action, $a_{AB}$ equals 0.19, which is smaller than the original magnitudes: 1.38 for $a_A$ and 1.53 for $a_B$. The reduction in magnitude is because the sequence $a_{AB}$ is more regular than either of $a_A$ and $a_B$.

In the chart on the right of FIG. 5, the same process for $a_B$ and $a_C$ is applied. The magnitudes are 2.03 for $a_{BC}$, 1.54 for $a_B$, and 0.09 for $a_C$. In this case, merging $a_B$ and $a_C$ results in an increase in magnitude because the sequence $a_{BC}$ is less regular than either of $a_B$ and $a_C$. Accordingly, based on the above, a recognition score, $S_r(a_A)$, for each individual action a can be computed that belongs to entity A and which is inversely proportional to the magnitude of the complex number $C_A{}^{(a)}$. In particular, $S_r(a_A) = M - mag(C_A{}^{(a)})$, where $mag(C_A{}^{(a)})$ is the magnitude of $C_A{}^{(a)}$ and M is the maximum computed magnitude.

To compute the overall $S_r(A)$, the individual scores, $S_r(a_A)$, are averaged, each weighted by the number of times its respective action was repeated ($n_A{}^{(a)}$). The formula for $S_r(A)$ is thus given as follows:

$$S_r(A) = \frac{1}{n_A} \sum_{\forall a} n_A^{(a)} \cdot S_r(a_A) \quad (4)$$

After computing the complex numbers representation for each action in an entity, $S_r(a_A) = M - mag(C_A{}^{(a)})$, where M is the maximum computed magnitude can be computed. Accordingly:

$$S(A) = \frac{1}{n_A} \sum_{\forall a} n_A^{(a)} (M - mag(C_A^{(a)}))$$

By substituting the above into Eq. 1, the matching score $S_m(A,B)$ can be computed:

$$S_m(A, B) = \frac{n_A}{n_A + n_B}$$

-continued $$\left[ \frac{1}{n_A + n_B} \sum_{\forall a} (n_A^{(a)} + n_B^{(a)})(M - mag(C_{AB}^{(a)})) - \right.$$

$$\left. \frac{1}{n_A} \sum_{\forall a} (n_A^{(a)})(M - mag(C_A^{(a)})) \right] + \frac{n_B}{n_A + n_B}$$

$$\left[ \frac{1}{n_A + n_B} \sum_{\forall a} (n_A^{(a)} + n_B^{(a)})(M - mag(C_{AB}^{(a)})) - \frac{1}{n_B} \sum_{\forall a} (n_B^{(a)})(M - mag(C_B^{(a)})) \right]$$

By simple rearrangement to collect the terms related to $mag(C_{AB}{}^{(a)})$.

$$S_m(A, B) = \frac{1}{n_A + n_B} \sum_{\forall a} [(n_A^{(a)} + n_B^{(a)})M - (n_A^{(a)} + n_B^{(a)})mag(C_{AB}^{(a)}) -$$

$$n_A^{(a)}M + n_A^{(a)}mag(C_A^{(a)}) - n_B^{(a)}M + n_B^{(a)}mag(C_B^{(a)})]$$

Note that the terms of M will cancel out and the final matching score according to an example is given by:

$$S_m(A, B) =$$

$$\frac{1}{n_A + n_B} \sum_{\forall a} [n_A^{(a)}mag(C_A^{(a)}) - n_B^{(a)}mag(C_B^{(a)}) - (n_A^{(a)} + n_B^{(a)})mag(C_{AB}^{(a)})]$$

In an example, complex number information for each data source can be stored in a relation with the attributes (entity, action, Re, Im, mag, a_supp, e_supp), where there is a tuple for each entity and its actions. For each action of an entity, the real and imaginary components (Re and Im) of the complex number as well as the magnitude (mag) can be stored. a_supp is the number of transaction for that action within the entities log and e_supp is total number of transactions for the entity repeated with each tuple corresponding an action. Thus, there are two tables representing each of the two data sources src1 and src2. To generate the candidates, a solution to the above equation is computed for each pair of entities and the results are filtered using a threshold t, on the resulting matching score such that only matches above the threshold are passed for example.

According to an example, accurate matching following candidate generation is performed using a statistical model for the behavior of an entity given its observed actions. The two key variables defining an entity's behavior with respect to a specific action are (1) the inter-arrival time between the action occurrences, and (2) the feature id (F_id) associated with each occurrence, which represents the features describing how the action was performed at that time, or in other words it reflects the entity's preferences when performing this action.

Typically, an entity will be biased to a narrow set of inter-arrival times and feature ids which is what will distinguish the entity's behavior. In merging two behavior matrices for the same entity, the bias should generally be enforced. However, when the behavior matrices of two different entities are merged, the bias will instead typically be weakened and harder to recognize.

A system and method according to an example uses a generated model for the behavior of an entity to determine motifs or patterns by separating them from some background sequence that is random in nature. In the present case, a motif can correspond to a sequence of an action by the same entity. A model according to an example will fit for: (a) sequences of two variables (inter-arrivals and feature id) and (b) for ordinal variables (such as the inter-arrival time), neighboring values need to be treated similarly.

In an example, the behavior of an entity A with respect to a specific action a can be modeled using a finite mixture model $M=\{M_1, \ldots, M_K\}$, with mixing coefficients $\lambda^{(a,A)}=\{\lambda_1^{(a,A)}, \ldots, \lambda_K^{(a,A)}\}$, where $M_k$ is its $k^{th}$ component. Each component $M_k$ is associated with two random variables: (i) The inter-arrival, which is generated from a uniform distribution over the range of inter-arrival times, $r_k=\text{start}_k,\text{end}_k$. (ii) The feature id, which is a discrete variable, and which is modeled using a multinomial distribution with parameter $\theta_k^{(a,A)}=\{f_{k1}^{(a,A)}, \ldots, f_{kL}^{(a,A)}\}$, where L is the number of all possible feature ids, and $f_{kj}^{(a,A)}$ is the probability to describe the occurrence of action a using feature $F_j$, $j=1, \ldots, L$. The range size of $r_k$ is user-configurable and can depend on the application. For example, ranges can be generated by sliding, over the time period, a window of size 5 days with a step of 3 days. (i.e. $\{\{1,6\},\{4,9\},\{7,12\},\}$). Other alternatives are possible.

For the sake of clarity, the superscript $a_A$ is omitted hereinafter, and it is assumed that there is only one action in the system so as to simplify the notations. The model for an entity can be considered to be a generative model in the sense that once built, it can be used to generate new action occurrences for the entity. For example, using $\lambda$, the component $M_k$ to generate the next action occurrence can be selected, and this should occur after an inter-arrival time picked from the corresponding range $r_k=\text{start}_k,\text{end}_k$. The action can be described by selecting a feature id using $\theta_k$. According to an example, the estimated parameters of the model ($\lambda$ and the vectors $\theta_k$) are used to determine a measure representing the level at which repeated patterns in a sequence corresponding to action occurrences are recognized.

For example, consider that a customer's behavior with respect to the action of buying chocolate is represented by the sequence $\{\{6,s\},\{15,l\},\{6,s\},\{8,s\},\{15,l\},\{14,l\},\{13,l\}\}$, where s denotes a small quantity (e.g., 1-5 bars), and l denotes a large quantity (e.g., more than 5 bars). A small quantity of chocolate was bought after 6 days, and a large quantity after 15 days, and so on. To characterize the inter-arrival times preferred by this customer, the best ranges of size 2 to use are [6,8] and [13,15]. Their associated mixing coefficients ($\lambda_k$) should be 3/7 and 4/7 because the two ranges cover 3 and 4 respectively out of the 7 observed data points. However, since in general, the best ranges in a behavior sequence will not be as clear as in this case, all the ranges of a given size (2 in this case) are considered, and mixing coefficients are assigned to each of them. The possible ranges in this example would therefore be $\{[6,8], [7,9],[8,10], \ldots ,[13,15]\}$.

An approach to compute $\lambda_k$ for each range is to compute the normalized frequency of occurrence of the given range for all the observed data points. For example, the normalized frequencies for the ranges [6,8], [12,14], and [13,15] are 3/12, 2/12, and 4/12 (or 1/4, 1/6, and 1/3) respectively, where 12 is the sum of frequencies for all possible ranges. Note that the same inter-arrival time may fall in multiple overlapping ranges. Clearly, these are not the desired values for $A_k$. It is desired to have zero values for all ranges other than [6,8] and [13,15]. However, these normalized frequencies can still be used as the initial values for $\lambda_k$ to be fed into an expectation maximization algorithm as will be described below.

Similarly, to compute the initial values for the $\theta_k$ probabilities, the data points covered by the range corresponding to component $M_k$ are considered. Then, for each possible value of the feature id, its normalized frequency across these data points is computed. In the example above, the customer favors buying small quantities when s/he shops at short intervals (6-8 days apart), and large quantities when s/he shops at longer intervals (13-15 days apart).

According to an example, and as mentioned above, an Expectation Maximization (EM) algorithm is used in order to fit the mixture model for each specific action a of an entity A to discover the optimal parameter values which maximize the likelihood function of the observed behavior data. To simplify the notations, it is assumed that there is only one action in the system, and so the superscript that links the entity and action names is omitted for the sake of clarity.

As described, a model consists of K components $M=\{M_1, \ldots, M_K\}$, where each component $M_i$ describes the occurrence of an action using two variables: $r_k=\text{start},\text{end}$ with a uniform distribution, which represents a range of inter-arrival time of the action, and $\theta_k$, which represents an independent random variable describing a multinomial trial with parameters $\theta_k=\{f_{k1}, \ldots, f_{kL}\}$ where L is the number of possible features to describe the action when it occurs. $f_{kj}$ is the probability to describe an action using feature $F_j$ in component $M_k$. The different parameters $f_{kj}$, with $k=\{1, \ldots, K\}$ and $j=\{1, \ldots, L\}$, are estimated from the entity's transaction log. The overall model of the pattern is achieved by estimating the components' mixing coefficient $\lambda=\{\lambda_1, \ldots, \lambda_K\}$. $\lambda_k$, with $\Sigma_{k=1}^{K}\lambda_k=1$, is the probability of using component $M_k$ to get the next entry $\{v,F(v)\}$ in the sequence X; i.e. after how many time units, v, the action will occur and how it will be described, $F^{(v)}$. Accordingly, the parameters for the overall model of an action are the mixing coefficient $\lambda$ and the vector $\theta_k$ for each component $M_k$, where $k=\{1, \ldots, M\}$.

According to an example, the EM uses the concept of missing data and follows an iterative procedure to find values for $\lambda$ and $\theta$, which maximizes the likelihood of the data given the model. The missing data is the knowledge of which components produced $X=\{\{v_1,F^{(v_1)}\}, \ldots, \{v_N,F^{(v_N)}\}\}$. A finite mixture model assumes that the sequence X arises from two or more components with different, unknown parameters. Once these parameters are obtained, they are used to compute the behavior scores along each of the behavior three components.

In an example, a K-dimensional binary random variable Z with a 1-of-K representation in which a particular $z_k$ is equal to 1 and all other elements are equal to 0, i.e., $z_k \in \{0,1\}$ and $\Sigma_{k=1}^{K}z_k=1$, such that the probability $p(z_k=1)=\lambda_k$. Every entry in the sequence $X_i$ is assigned $Z_i=\{z_{i1}, z_{i2}, \ldots, z_{iK}\}$, Accordingly, the probability:

$$p(X_i | \theta_1, \ldots, \theta_K) = \sum_{k=1}^{K} p(z_{ik}=1)p(X_i | Z_i, \theta_1, \ldots, \theta_K)$$

$$= \sum_{k=1}^{K} \lambda_k p(X_i | \theta_k)$$

Since $z_{ik}$ is not known, the conditional probability $\gamma(z_{ik})$ of $z_{ik}$ given $X_i$ is considered to be $p(z_{ik}=1|X_i)$, which can be found using Bayes' theorem:

$$\gamma(z_{ik}) = \frac{p(z_{ik} = 1)p(X_i \mid z_{ik} = 1)}{\sum_{k=1}^{K} p(z_{ik} = 1)p(X_i \mid z_{ik} = 1)} \quad (7)$$

$$= \frac{\lambda_k p(X_i \mid \theta_k)}{\sum_{k=1}^{K} \lambda_k p(X_i \mid \theta_k)}$$

The $\lambda_k$ is viewed as the prior probability of $z_{ik}=1$, and $\gamma(z_{ik})$ as the corresponding posterior probability once X is obtained. $\gamma(z_{ik})$ can also be viewed as the 'responsibility' that component $M_k$ takes for explaining the observation $X_i$. Therefore, the likelihood or probability of the data given the parameters can be written in the log form as:

$$\ln p(X \mid \lambda, \theta) = \sum_{i=1}^{N} \sum_{k=1}^{K} \gamma(z_{ik}) \ln[\lambda_k p(X_i \mid \theta_k)] \quad (5)$$

$$= \sum_{i=1}^{N} \sum_{k=1}^{K} \gamma(z_{ik}) \ln p(X_i \mid \theta_k) +$$

$$\sum_{i=1}^{N} \sum_{k=1}^{K} \gamma(z_{ik}) \ln \lambda_k$$

According to an example, the EM algorithm monotonically increases the log likelihood of the data until convergence by iteratively computing the expected log likelihood of the complete data (X,Z) in the E step and maximizing this expected log likelihood over the model parameters $\lambda$ and $\theta$. Some initial values for the parameters $\lambda^{(0)}$ and $\theta^{(0)}$ are chosen, and then the E-step and M-step of the algorithm are alternated between until convergence. In the E-step, to compute the expected log likelihood of the complete data, the required conditional distribution $\gamma^{(0)}(z_{ik})$ is computed. The values $\lambda^{(0)}$ and $\theta^{(0)}$ are used with equation 5 above to compute $\gamma^{(0)}(z_{ik})$. $p(X_i|\theta_k)$ can be computed as follows:

$$p(X_i \mid \theta_k) = \prod_{j=1}^{L} f_{kj}^{I(j,k,F^{(v_i)})} \quad (6)$$

where $X_i = \{v_i, F^{(v_i)}\}$ and $I(j,k,F^{(v_i)})$ is an indicator function equal to 1 if $v_i \in r_k$ and $F^{(v_i)} = F_j$; otherwise it is 0. Recall that $r_k$=start,end is the period identifying the component $M_k$.

The M-step of the EM process maximizes equation 6 over $\lambda$ and $\theta$ in order to re-estimate new values for them: $\lambda^{(1)}$ and $\theta^{(1)}$. The maximization over involves only the second term in equation 6, and $\text{argmax}_\lambda \Sigma_{i=1}^{N} \Sigma_{k=1}^{K} \gamma(z_{ik}) \ln \lambda_k$, has the solution $$\lambda_k^{(1)} = \frac{1}{N} \sum_{i=1}^{N} \gamma^{(0)}(z_{ik}), k = 1, \dots, K. \quad (7)$$

In order to maximize over $\theta$, the first term in equation 6 is maximized separately over each $\sigma_k$ for $k=\{1, \dots, K\}$. Accordingly, $\text{argmax}_\theta E(\log p(X,Z|\theta_i, \dots, \theta_K)]$ is equivalent to maximizing the right hand side of equation 8 over $\theta_k$ (only a piece of the parameter) for every k:

$$\theta_k = \text{argmax}_{\theta_k} \sum_{i=1}^{N} \gamma^{(0)}(z_{ik}) \ln p(X_i \mid \theta_k), \quad (8)$$

To do this, for $k=\{1, \dots, K\}$ and $j=\{1, \dots, L\}$ let $$c_{kj} = \sum_{i=1}^{N} \gamma^{(0)}(z_{ik}) I(j, k, F^{(v_i)}) \quad (9)$$

Then $c_{kj}$ is in fact the expected number of times to describe the action by $F_j$ when its inter-arrival falls in $M_k$'s range $r_k$. The $\theta_k$ can be re-estimated by substituting equation 7 into equation 9 to provide:

$$\theta_k^{(1)} = \{\hat{f}_{k1}, \dots, \hat{f}_{kL}\} = \text{argmax}_{\theta_k} \sum_{j=1}^{L} c_{kj} \ln f_{kj} \quad (10)$$

Therefore:

$$\hat{f}_{kj} = \frac{c_{kj}}{\sum_{j=1}^{L} c_{kj}} \quad (11)$$

To find the initial parameters $\lambda^{(0)}$ and $\theta^{(0)}$, the sequence X can be scanned once and equation 10 can be used to determine the $c_{kj}$ by setting all) $\gamma^{(0)}=1$. Following this, equation 11 can be used to compute $\theta_k^{(0)}$ and:

$$\lambda_k^{(0)} = \frac{\sum_{j=1}^{L} c_{kj}}{\sum_{k=1}^{K} \sum_{j=1}^{L} c_{kj}}$$

As described, to match two entities A and B, the gain $S_m(A,B)$ in recognizing a behavior after merging A and B is computed using equation 1. This requires computing the scores $S_r(A)$, $S_r(B)$ and $S_r(AB)$ using equation 2, which in turn requires computing the behavior recognition scores corresponding to the three behavior components, which, for entity A for example, are $S_{r1}(A)$, $S_{r2}(A)$, and $S_{r3}(A)$.

As mentioned, for the first behavior component, the consistency in repeating an action a is equivalent to classifying its sequence as a motif, and the pattern strength can be quantified to be inversely proportional to the uncertainty about selecting a model component using $\lambda^{(a_A)}$. That is to say, action a's sequence is a motif if the uncertainty about $\lambda^{(a_A)}$ is low. Thus, entropy can be used to compute $S_{r1}(a_A) = \log K - H(\lambda^{(a_A)})$, where $H(\lambda^{(a_A)}) = -\Sigma_{k=1}^{K} \lambda_k^{(a_A)} \log \lambda_k^{(a_A)}$, and the overall score $S_{r1}(A)$ is then computed by a weighted sum over all the actions according to their support, i.e., the number of times the action was repeated.

$$S_{r1}(A) = \frac{1}{n_A} \sum_{\forall a} n_A^{(a)} \cdot S_{r1}(a_A) \quad (15)$$

For the second behavior component, the stability in describing the action (action features) is more recognizable when the uncertainty in picking the feature id values is low. According to an example, the behavior score along this component can be evaluated by first computing $\theta'^{(a_A)} = \{f_1'^{(a_A)}, \ldots, f_L'^{(a_A)}\}$, is the overall parameter to pick a feature id value for action a using the multinomial distribution such that the overall probability for entity A to describe its action a by feature $F_j$ is $f_j'^{(a_A)}$. Here, $f_j'^{(a_A)} = \Sigma_{k=1}^K \lambda_k^{(a_A)} f_{kj}^{(a_A)}$ is combined from the all K components for $j=1, \ldots, L$, knowing that $\theta_k^{(a_A)} = \{f_{k1}^{(a_A)}, \ldots, f_{kL}^{(a_A)}\}$. Using the entropy of $\theta'^{(a_A)}$, $S_{r2}(a^A) = \log L - H(\theta'^{(a_A)})$ is computed, where $H(\theta'^{(a_A)}) = -\Sigma_{j=1}^L f_j'^{(a_A)} \log f_j'^{(a_A)}$. The overall score for $S_{r2}(A)$ can be computed as the weighted sum for $S_{r2}(a_A)$ according to the actions support.

For the third component, evidence about the associations between actions is determined. For every pair of actions, its probability of being generated from components with the same inter-arrival ranges is estimated. The association between actions can be recognized when they occur close to each other. In other words, this can occur when both of them tend to prefer the same model components to generate their sequences. For example, the score for the third component can be computed over all possible pairs of actions for the same entity as follows:

$$S_{r3}(A) = \sum_{\forall a,b} \sum_{k=1}^K \lambda_k^{(a_A)} \lambda_k^{(b_A)}$$

According to an example, the similarity between two behaviors can be quantified by the closeness between the parameters of their corresponding behavior models computed using the Euclidean distance. For two entities A and B, a behavior similarity BSim(A,B) can therefore be computed as:

$$BSim(A, B) = 1 - \frac{1}{n_A + n_B} \sum_{\forall a} (n_A^a + n_B^a)$$

$$\sqrt{\sum_{k=1}^K \left[ (\lambda_k^{(a_A)} - \lambda_k^{(a_B)})^2 + \sum_{j=1}^L (\lambda_k^{(a_A)} f_{kj}^{(a_A)} - \lambda_k^{(a_B)} f_{kj}^{(a_B)})^2 \right]}.$$

In an example, this method may be preferred over directly comparing the BM s of the entities, since the latter method would require alignment for the time dimension of the BM s. In particular, deciding which cells to compare to which cells may not be obvious.

According to an example, an information theory-based technique for the computation of the matching scores can also be used. Although such a technique will typically not be as accurate as the technique described above, it can be more computationally efficient. The underlying idea stems from observing that if a BM is represented as an image, there will be horizontal repeated blocks that would be more recognizable if the behavior is well recognized. The repeated blocks appear because of the repetition in the behavior patterns. Therefore, more regularity along the rows than along the columns of the BM can be expected. In fact, the order of values in any of the columns depends on the order of the actions in the BM, which is not expected to follow any recognizable patterns. For these reasons, the BM can be compressed on a row by row basis, rather than compressing the entire matrix as a whole.

Typically, compression techniques exploit data repetition and encode it in a more compact representation. According to an example, compressibility can be used as a measure of confidence in recognizing behaviors. For example, a BM can be compressed using the DCT compression technique, being one of the most commonly used compression techniques in practice. The compression ratios can then be used to compute the behavior recognition scores. Significantly higher compression ratios imply a more recognizable behavior.

Given the sequence representation of an action occurrence i.e. $\{\{v_j, F^{(v_j)}\}\}$, if an entity follows stability in repeating an action, the values $v_j$'s will follow a certain level of correlation showing the action rate. Moreover, the features values $F^{(v_j)}$ will contain similar values to describe how the action was performed.

An aim is to compute the three behavior recognition scores along the three behavior components described above. For the first behavior component, the sequence $$\{v_1, \ldots, v_{n_A^{(a)}}\}$$

can be compressed, which represents the inter-arrival times for each action a. The behavior score, $S_{r1}(a_A)$ for action a of entity A, will then be the resultant compression ratio; the higher the compression ratio, the more a consistent inter-interval time (motif) can be recognized. The equation for the final matching score can be used to compute the overall score $S_{r1}(A)$. Similarly, for the second behavior component, the sequence $$\{F^{(v_1)}, \ldots, F^{(v_{n_A^{(a)}})}\}$$

can be compressed, which represents the feature values that describe the action a. Again, the score $S_{r2}(a_A)$ is the generated compression ratio; the higher the compression ratio, the more that stability in action features can be recognized. Similarly to $S_{r2}(a_A)$, the overall score $S_{r2}(A)$ can be computed.

Finally, for the third behavior component, which evaluates the relationship between the actions, the concatenated sequences of inter-arrival times of every possible pair of actions can be compressed. Given two actions a and b, concatenation occurs and then compression of the inter-arrival times is performed to arrive at the compression ratio $cr_{a,b}$. If a and b are closely related, they will have similar inter-arrival times allowing for better compressibility of the concatenated sequence. On the contrary, if they are not related, the concatenated sequence will contain varying values. Thus, $cr_{a,b}$ quantifies the association between actions a and b. Hence, the overall pairwise association provides a measure for the strength in the relationship between the actions that can be computed by:

$$S_{r3}^{(A)} = \sum_{\forall a,b} cr_{a,b}$$

Figure 6:
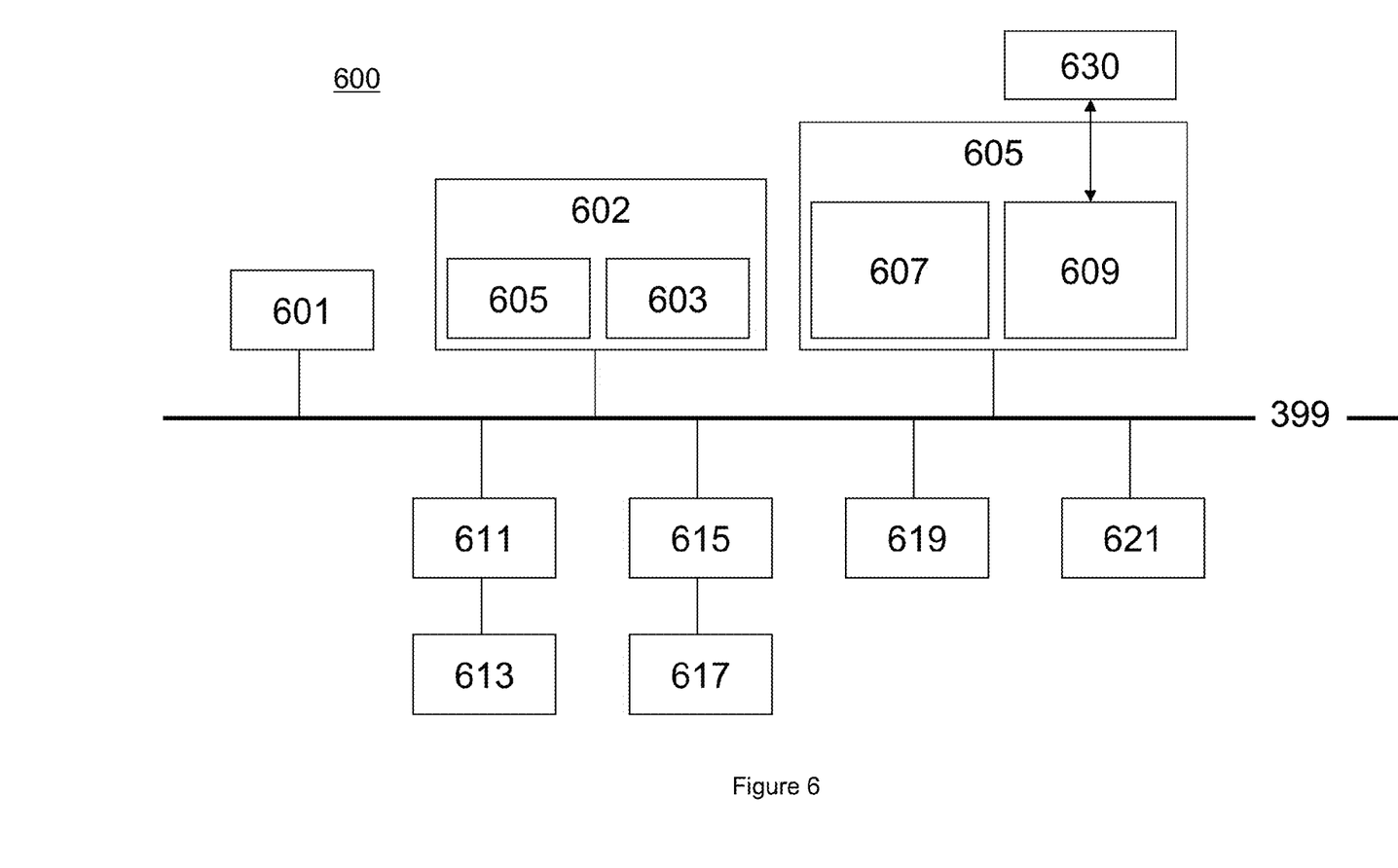
FIG. 6 is a schematic block diagram of an apparatus according to an example.

FIG. 6 is a schematic block diagram of an apparatus according to an example suitable for implementing a system, method or process described above. Apparatus 600 includes one or more processors, such as processor 601 which can be a multi-core processor, providing an execution platform for executing machine readable instructions such as software. Commands and data from the processor 601 are communicated over a communication bus 399. The system 600 also includes a main memory 602, such as a Random Access Memory (RAM), where machine readable instructions may reside during runtime, and a secondary memory 605. The secondary memory 605 includes, for example, a hard disk drive 607 and/or a removable storage drive 630, representing a floppy diskette drive, a magnetic tape drive, a compact disk drive, etc., or a nonvolatile memory where a copy of the machine readable instructions or software may be stored. The secondary memory 605 may also include ROM (read only memory), EPROM (erasable, programmable ROM), EEPROM (electrically erasable, programmable ROM). In addition to software, data representing any one or more of candidate matches, matches, matching scores, entities, transaction logs (raw or processed), and listings for tuples may be stored in the main memory 602 and/or the secondary memory 605. The removable storage drive 630 reads from and/or writes to a removable storage unit 609 in a well-known manner.

A user can interface with the system 600 using one or more input devices 611, such as a keyboard, a mouse, a stylus, and the like in order to provide user input data or manipulate certain computed results for example. The display adaptor 615 interfaces with the communication bus 399 and the display 617 and receives display data from the processor 601 and converts the display data into display commands for the display 617. A network interface 619 is provided for communicating with other systems and devices via a network (not shown). The system can include a wireless interface 621 for communicating with wireless devices in the wireless community.

It will be apparent to one of ordinary skill in the art that one or more of the components of the system 600 may not be included and/or other components may be added as is known in the art. The system 600 shown in FIG. 6 is provided as an example of a possible platform that may be used, and other types of platforms may be used as is known in the art. One or more of the steps described above may be implemented as instructions embedded on a computer readable medium and executed on the system 600. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

In an example, modules 603, 605 in memory 602 can include data representing a finite mixture model for an entity and a set of parameters determined using an expectation maximization process. Memory 602 can also include a module comprising data representing a set of candidate matches computed using a DFT as described above.

Figure 7:
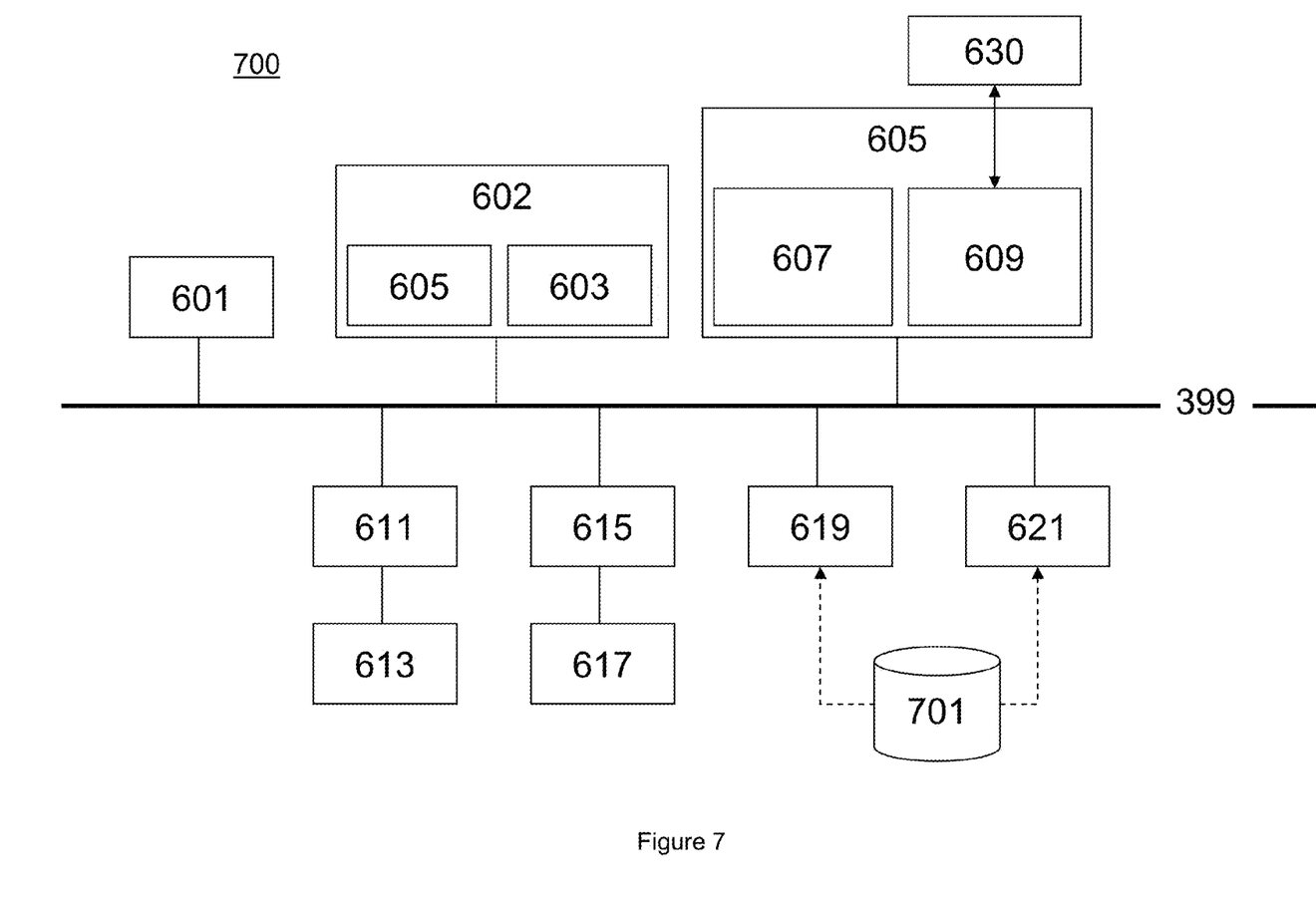
FIG. 7 is a schematic block diagram of a system according to an example.

FIG. 7 is a schematic block diagram of a system according to an example. Apparatus 700 of FIG. 7 is similar to that of FIG. 6. A database 701, which can be a remote database for example, stores data such as entity information and transaction logs. Apparatus 700 is operatively coupled to the database 701, for example by a communication link using the NIC 619 or wireless interface 621, and can receive and send data from and to the database 701. Accordingly, a finite mixture model module 603 can be used to perform matches for the data residing on the database 701, and a computed set of parameters 605 can be used to provide a matching score to a user via the display 617 for example.

Figure 8:
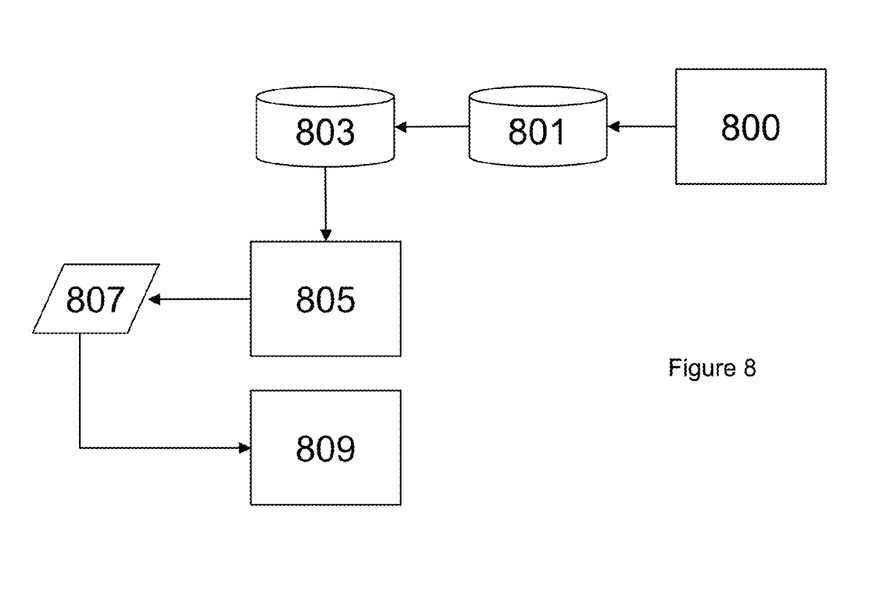
FIG. 8 is a schematic block diagram of a method according to an example.

FIG. 8 is a block diagram of a method according to an example. As such, in a computer implemented method for matching data records 801 from multiple entities 800, respective transaction logs 803 for the entities 800 representing actions performed by or in respect of the entities 800 are provided. In block 805, a matching score is determined using the transaction logs 803 for respective pairs of the entities and for predetermined combinations of merged entities by generating a measure 807 representing a gain in behavior recognition for the entities 800 before and after merging. In block 809 the gain is used as a matching score.

Figure 9:
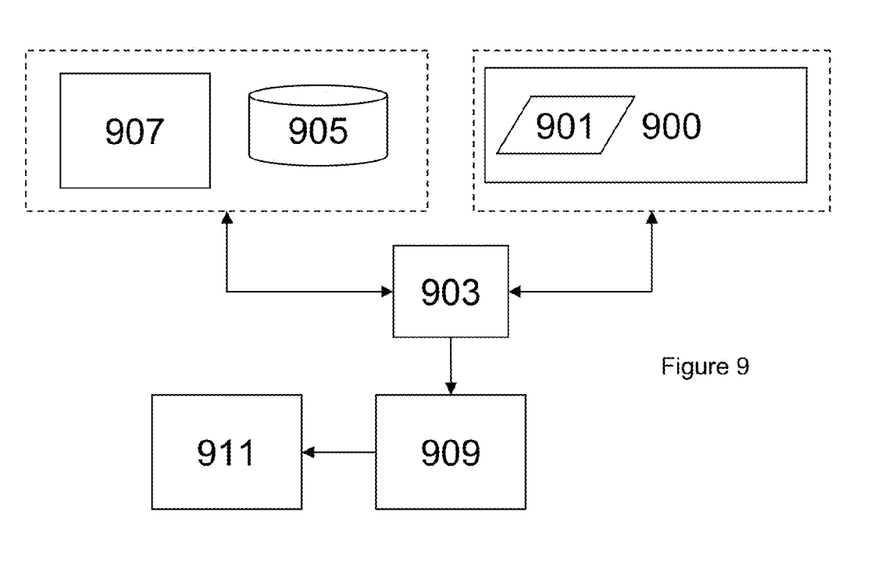
FIG. 9 is a schematic block diagram according to an example.

FIG. 9 is a block diagram according to an example, in which there is a computer program embedded on a non-transitory tangible computer readable storage medium 900, the computer program including machine readable instructions 901 that, when executed by a processor 903, implement a method for matching data records from multiple entities 907 comprising providing respective transaction logs 905 for the entities 907 representing actions performed by or in respect of the entities, determining a matching score 911 using the transaction logs 905 for respective pairs of the entities 907 and for predetermined combinations of merged entities by generating a measure 909 representing a gain in behavior recognition for the entities before and after merging, and using the gain as a matching score.

Figure 10:
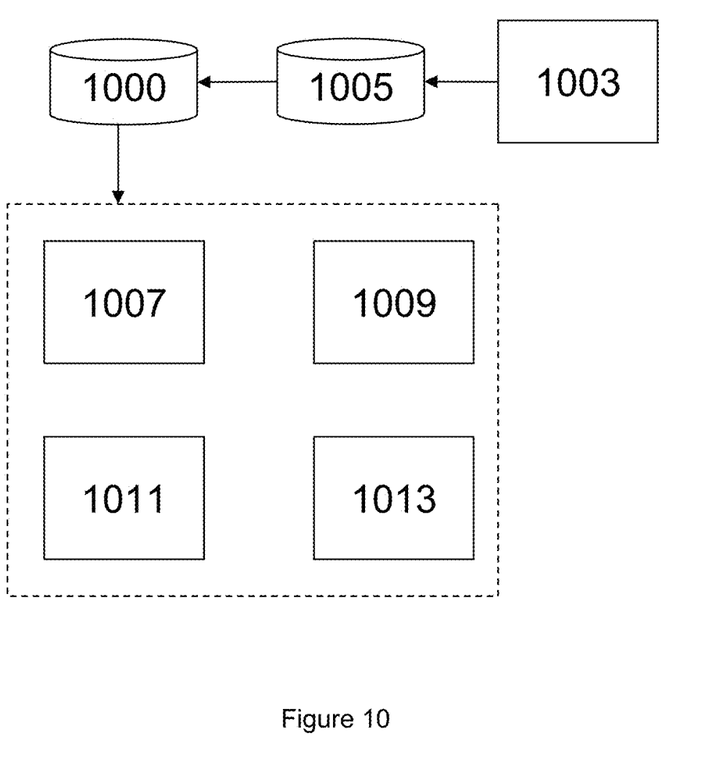
FIG. 10 is a schematic block diagram of a method according to an example.

FIG. 10 is a block diagram of a method according to an example. In block 1007 a coarse match for records 1003 is determined using a value representing a period of occurrence 1000 of certain actions 1005 for an entity including data from a merged pair of sources, for a match above a predetermined threshold 1009, using a statistical model 1011 to determine a final matching score 1013.

What is claimed is:

1. A computer implemented method, with at least one step executed by a computer, the method for matching data records from multiple entities to identify if the multiple entities are the same entity, comprising:
   providing respective transaction logs for the multiple entities representing actions performed by or in respect of the multiple entities;
   extracting behavior data for the multiple entities from the transaction logs;
   determining candidate entity matches between pairs of entities using the behavior data of each entity of the pair by generating pairs of entity matches and using those pairs not discarded by a coarse matching function as candidate entity matches;

merging the behavior data of each pair of candidate entity matches to generate a merged behavior matrix for each pair;

calculating a behavior recognition score for the merged behavior matrix and for each entity of the pair of candidate entity matches;

determining a gain from the behavior recognition score for each entity of the pair of candidate entity matches to the recognition score for the merged behavior matrix of the respective pair of candidate entity matches;

determining a matching score for each pair of candidate entity matches using the gain in behavior recognition score, wherein the gain in behavior recognition score is indicative of the two entities in the pair of candidate entity matches being the same entity;

identifying which entities represent the same entity among the multiple entities if the matching score is above a predetermined threshold; and associating the identified matching entities of the multiple entities as the same entity.

2. A method as claimed in claim 1, further comprising converting the transaction logs to a predetermined format to provide a processed log including data from the transaction logs and a set of identifiers representing combinations of features for respective actions.

3. A method as claimed in claim 2, further comprising generating a behavior matrix for an entity using the identifiers.

4. A method as claimed in claim 3, further comprising generating a first element of a discrete Fourier transform for a binarised behavior matrix in which non zero values are replaced with the value "1" to provide a complex number representing an action in the behavior matrix.

5. A method as claimed in claim 4, wherein the inverse of the magnitude of the complex number represents a recognition score for an action of an entity.

6. A method as claimed in claim 1, wherein determining a matching score includes determining if a merged entity exhibits a consistent behavior compared to a behavior pattern of actions for the individual entities.

7. A method as claimed in claim 1, wherein determining a matching score includes determining the behavior recognition score for a behavior of an entity representing consistency of the entities behavior over multiple components.

8. A method as claimed in claim 7, wherein the multiple components include a measure representing consistency in repeating actions, a measure representing stability in features describing actions, and a measure representing association between actions.

9. A method as claimed in claim 1, further comprising generating a statistical model for the behavior of an entity using the transaction log for that entity, wherein parameters of the model are used to determine a measure for repeated patterns in a sequence corresponding to action occurrences for an entity.

10. A method as claimed in claim 1, comprising using the transaction logs of the entities to generate the measure representing the gain in the behavior recognition score, wherein the behavior recognition score represents the similarity in behaviors between the entities.

11. A computer program embedded on a non-transitory tangible computer readable storage medium, the computer program including machine readable instructions that, when executed by a processor, implement a method for matching data records from multiple entities to identify if the multiple entities are the same entity, comprising:

providing respective transaction logs for the multiple entities representing actions performed by or in respect of the multiple entities;

extracting behavior data for the multiple entities from the transaction logs;

determining candidate entity matches between pairs of entities using the behavior data of each entity of the pair by generating pairs of entity matches and using those pairs not discarded by a coarse matching function as candidate entity matches;

merging the behavior data of each pair of candidate entity matches to generate a merged behavior matrix for each pair;

calculating a behavior recognition score for the merged behavior matrix and for each entity of the pair of candidate entity matches;

determining a gain from the behavior recognition score for each entity of the pair of candidate entity matches to the recognition score for the merged behavior matrix of the respective pair of candidate entity matches;

determining a matching score for each pair of candidate entity matches using the gain in behavior recognition score, wherein the gain in behavior recognition score is indicative of the two entities in the pair of candidate entity matches being the same entity;

identifying which entities represent the same entity among the multiple entities if the matching score is above a predetermined threshold; and associating the identified matching entities of the multiple entities as the same entity.

12. A computer program embedded on a non-transitory tangible computer readable storage medium as claimed in claim 11, the computer program including machine readable instructions that, when executed by a processor, implement a method for matching data records from multiple entities further comprising converting the transaction logs to a predetermined format to provide a processed log including data from the transaction logs and a set of identifiers representing combinations of features for respective actions.

13. A computer program embedded on a non-transitory tangible computer readable storage medium as claimed in claim 12, the computer program including machine readable instructions that, when executed by a processor, implement a method for matching data records from multiple entities further comprising generating a behavior matrix for an entity using the identifiers.

14. A computer program embedded on a non-transitory tangible computer readable storage medium as claimed in claim 13, the computer program including machine readable instructions that, when executed by a processor, implement a method for matching data records from multiple entities further comprising generating a first element of a discrete Fourier transform for a binarised behavior matrix in which non zero values are replaced with the value "1" to provide a complex number representing an action in the behavior matrix.

15. A computer program embedded on a non-transitory tangible computer readable storage medium as claimed in claim 14, the computer program including machine readable instructions that, when executed by a processor, implement a method for matching data records from multiple entities, wherein the inverse of the magnitude of the complex number represents a recognition score for an action of an entity.

16. A computer program embedded on a non-transitory tangible computer readable storage medium as claimed in claim 11, the computer program including machine readable instructions that, when executed by a processor, implement a method for matching data records from multiple entities wherein determining a matching score includes determining if a merged entity exhibits a consistent behavior compared to a behavior pattern of actions for the individual entities.

17. A computer program embedded on a non-transitory tangible computer readable storage medium as claimed in claim 11, the computer program including machine readable instructions that, when executed by a processor, implement a method for matching data records from multiple entities wherein determining a matching score includes determining the behavior recognition score for a behavior of an entity representing consistency of the entities behavior over multiple components.

18. A computer program embedded on a non-transitory tangible computer readable storage medium as claimed in claim 17, the computer program including machine readable instructions that, when executed by a processor, implement a method for matching data records from multiple entities wherein the multiple components include a measure representing consistency in repeating actions, a measure representing stability in features describing actions, and a measure representing association between actions.

19. A computer program embedded on a non-transitory tangible computer readable storage medium as claimed in claim 11, the computer program including machine readable instructions that, when executed by a processor, implement a method for matching data records from multiple entities further comprising generating a statistical model for the behavior of an entity using the transaction log for that entity, wherein parameters of the model are used to determine a measure for repeated patterns in a sequence corresponding to action occurrences for an entity.

* * * * *